United States Patent
Shibuya et al.

(10) Patent No.: US 9,471,103 B2
(45) Date of Patent: Oct. 18, 2016

(54) CRADLE

(71) Applicant: Seiko Epson Corporation, Shinjuku-ku (JP)

(72) Inventors: Junya Shibuya, Azumino (JP); Yukio Takei, Shiojiri (JP); Ryo Sato, Yokote (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 14/508,500

(22) Filed: Oct. 7, 2014

(65) Prior Publication Data

US 2015/0103484 A1 Apr. 16, 2015

(30) Foreign Application Priority Data

Oct. 11, 2013 (JP) .................................. 2013-213477

(51) Int. Cl.
| | | |
|---|---|---|
| *G06F 1/16* | (2006.01) | |
| *H02J 7/00* | (2006.01) | |
| G04C 10/00 | (2006.01) | |
| G04G 19/00 | (2006.01) | |
| G04G 21/00 | (2010.01) | |
| H04M 1/04 | (2006.01) | |

(52) U.S. Cl.
CPC ............ *G06F 1/1632* (2013.01); *G06F 1/163* (2013.01); *H02J 7/0042* (2013.01); *G04C 10/00* (2013.01); *G04G 19/00* (2013.01); *G04G 21/00* (2013.01); *H04M 1/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,454,608 B1* | 9/2002 | Kitahara | ............ | H01R 13/2421 439/358 |
| 6,952,343 B2* | 10/2005 | Sato | ...................... | G06F 1/1632 361/679.57 |
| 7,479,902 B2* | 1/2009 | Wang | ..................... | G06F 1/1632 341/22 |
| 7,911,779 B1* | 3/2011 | Tarnoff | ................. | G06F 1/1626 361/679.4 |
| 8,773,845 B2* | 7/2014 | Leung | .................... | G06F 1/1632 361/679.01 |
| 8,780,553 B2* | 7/2014 | Palmer | ................... | F16M 11/14 24/3.1 |
| 8,821,173 B2* | 9/2014 | Carnevali | ............. | G06F 1/1632 361/679.41 |
| 8,833,716 B2* | 9/2014 | Funk | ...................... | F16M 13/02 248/309.1 |
| 9,163,779 B2* | 10/2015 | Funk | ...................... | F16M 13/02 |
| 9,274,556 B2* | 3/2016 | Gallouzi | ............... | F16M 11/041 |
| 2009/0040877 A1* | 2/2009 | McGeough | ............ | G04G 11/00 368/73 |
| 2012/0189156 A1* | 7/2012 | Leung | ................... | G06F 1/1632 381/387 |
| 2013/0033807 A1* | 2/2013 | Kim | ...................... | G06F 1/1669 361/679.01 |
| 2014/0313657 A1* | 10/2014 | Kumar | .................. | G06F 1/1632 361/679.11 |
| 2015/0072555 A1* | 3/2015 | Riddiford | ............ | F16M 11/041 439/575 |

FOREIGN PATENT DOCUMENTS

| | | |
|---|---|---|
| JP | 2011-091924 A | 5/2011 |
| KR | 10-2011-0123898 A | 11/2011 |

OTHER PUBLICATIONS

Extended European Search Report, dated Mar. 17, 2015, of the corresponding European Application No. 14188285.2. (7 pages).

\* cited by examiner

*Primary Examiner* — Lisa Lea Edmonds
(74) *Attorney, Agent, or Firm* — Kilpatrick Townsend & Stockton LLP

(57) ABSTRACT

A cradle connects with an information terminal device that displays information. The cradle includes a first case including a first claw portion and a curved surface portion, a second case including a second claw portion, and a shaft portion holding the first case and the second case. At least one of the first case and the second case rotationally moves with the shaft portion as a reference to thereby increase a distance between the first claw portion and the second claw portion.

8 Claims, 6 Drawing Sheets

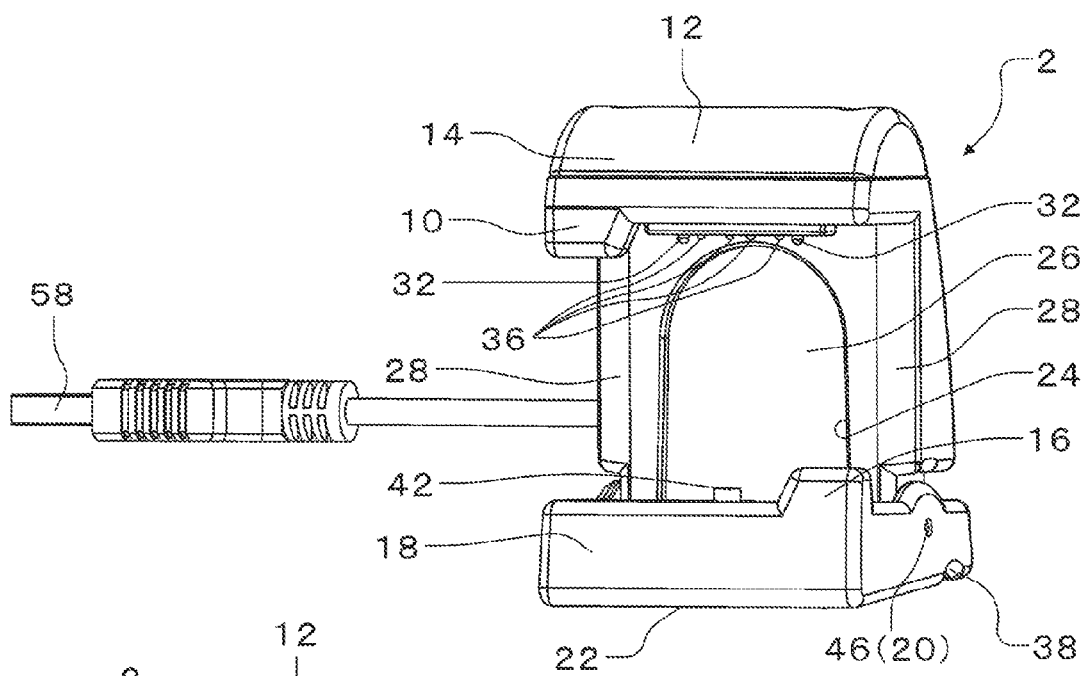
FIG. 1A
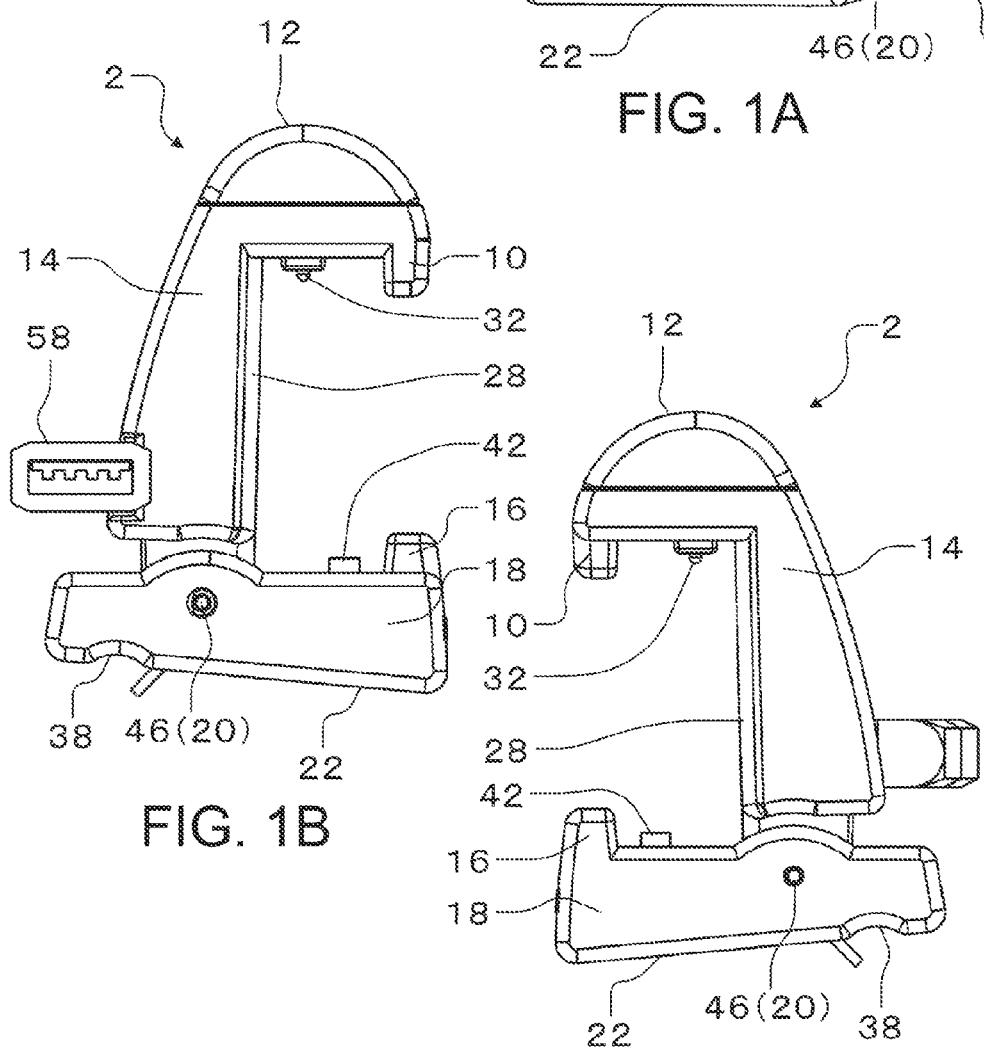
FIG. 1B
FIG. 1C

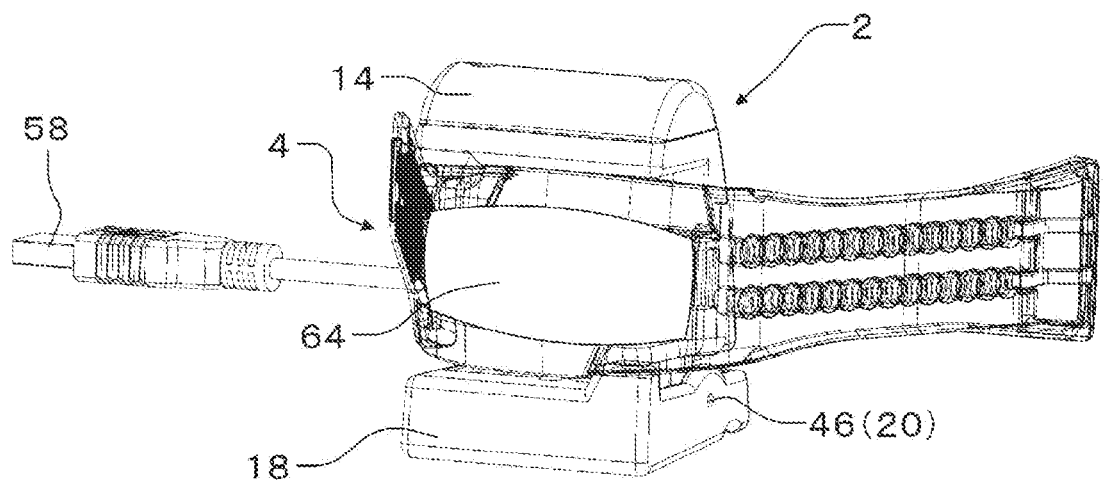
FIG. 6A
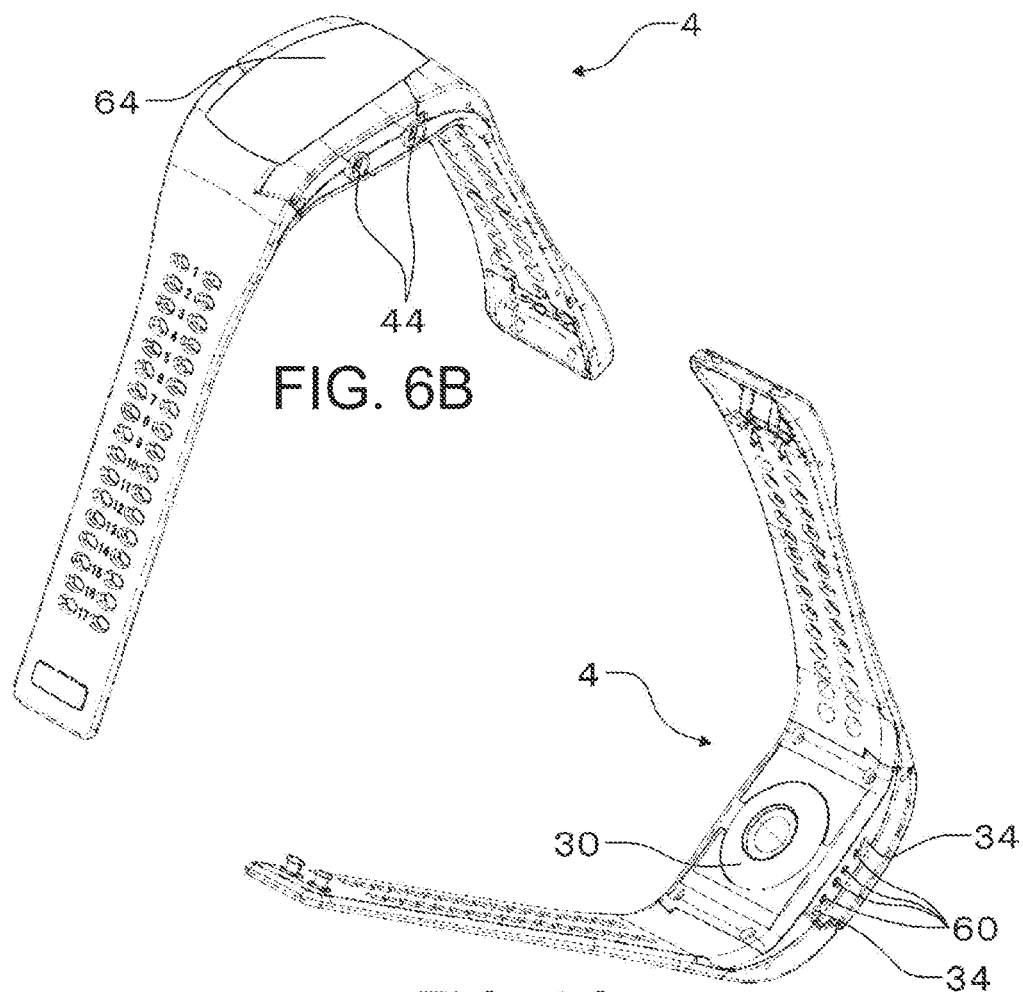
FIG. 6B
FIG. 6C

CRADLE

BACKGROUND

1. Technical Field

The entire disclosure of Japanese Patent Application No. 2013-213477, filed Oct. 11, 2013 is expressly incorporated by reference herein.

The present invention relates to a cradle.

2. Related Art

In the related art, there is an information terminal device in which two charging terminals and two communication terminals, four terminals in total, are arranged on a side surface of the device main body. A structure of a connector is required by which charging and data communication of the information terminal device can be performed through the setting of the information terminal device in a cradle. In the related art, there are some methods for setting the information terminal device in the cradle. For example, a cradle is disclosed in which the information terminal device is inserted into the cradle by sliding the information terminal device (for example, refer to JP-A-2011-091924).

Moreover, there is a structure in which two charging terminals and two communication terminals, four terminals in total, are arranged on a side surface portion of a main body of an information terminal device, and the device main body is set in a jig of a type in which the device main body is pushed from above to thereby bring the terminals on the device main body side into contact with terminals projecting from the jig to perform charging and data communication of the device main body.

Further, there is a structure in which charging and communication terminals protrude from a clip-type jig.

However, in the cradle into which the information terminal device is inserted by sliding it, the main body of the information terminal device is damaged.

Moreover, in the case of the jig of the type in which the device main body is pushed from above, when the information terminal device is forcibly pushed into the jig before the position of the information terminal device in a planar direction is determined, the information terminal device may be damaged or the jig may be broken, for example.

Further, in the structure in which the charging and communication terminals protrude from the clip-type jig, when a conductive substance such as a metal is accidentally interposed, a short circuit occurs between VBUS and GND on the charging side, which may break a PC to which the clip-type jig is connected.

Moreover, in a structure of setting the clip-type jig in the device main body, there is no mark (indication) in setting, giving rise to a problem that the user has to perform the setting while viewing terminals on a bottom surface portion of the device main body and a terminal portion of the clip-type jig and adjusting them together.

In view of the above, a structure of a cradle is required by which anybody can simply set an information terminal device in the cradle without damaging the information terminal device when connecting with the information terminal device.

SUMMARY

An advantage of some aspects of the invention is to solve at least a part of the problems described above, and the invention can be implemented as the following forms or application examples.

APPLICATION EXAMPLE 1

This application example is directed to a cradle connecting with an information terminal device that displays information, including: a first case including a first claw portion and a curved surface portion; a second case including a second claw portion; and a shaft portion holding the first case and the second case, wherein at least one of the first case and the second case rotationally moves with the shaft portion as a reference to thereby increase a distance between the first claw portion and the second claw portion.

According to this application example, the cradle has an interposing structure for setting the information terminal device in the cradle, in which the structure is configured such that when the cradle is not operated, a distance between the first claw portion and the second claw portion is short, while when a rotational movement operation of the cradle is performed, the distance between the first claw portion and the second claw portion is increased. With this configuration, it is possible to prevent the information terminal device from being forcibly pushed into and set in the cradle. Moreover, because of claw structures (the first claw portion and the second claw portion) protruding in an eaves shape and provided in the first case and the second case that interpose the information terminal device therebetween, it is possible to restrain an operation of forcibly pushing the information terminal device into the cradle or forcibly pulling out the information terminal device set in the cradle, so that an improper operation such as damaging the information terminal device can be prevented. As a result, the information terminal device can be easily set in the cradle without damaging the information terminal device, which minimizes forces applied to the cradle and the information terminal device in setting. Therefore, the cradle having enhanced product reliability can be provided.

Moreover, since the hand is in contact with the curved surface portion of the first case when performing the rotational movement operation of the cradle, the hand does not hurt, so that a burden or the like on the user is reduced.

APPLICATION EXAMPLE 2

This application example is directed to the cradle according to the application example described above, wherein at least one of surfaces of the first case facing the information terminal device includes a first recessed portion conforming to the shape of the information terminal device.

According to this application example, since the first recessed portion conforming to the shape of the information terminal device is provided in the first case and functions as a positioning structure, position alignment between the cradle and the information terminal device is smoothly performed, so that the information terminal device can be easily set in the cradle.

APPLICATION EXAMPLE 3

This application example is directed to the cradle according to the application example described above, wherein the first case includes a pair of tapered surfaces provided at edges of the first case.

According to this application example, fitting with the information terminal device is smoothly performed by adjusting the tapered surfaces to the R-shape of a bottom surface portion of the information terminal device, so that setting property can be improved.

APPLICATION EXAMPLE 4

This application example is directed to the cradle according to the application example described above, wherein at least one of surfaces of the first case facing the information terminal device includes an electrode on the surface, and the electrode projects from the surface of the first case toward a surface of the second case.

According to this application example, when, for example, the cradle is placed on a desk with a surface of the second case on the side opposite to a surface thereof facing the information terminal device facing down, the electrode is arranged downward. Therefore, it is possible to prevent dust or the like from adhering to the electrode.

APPLICATION EXAMPLE 5

This application example is directed to the cradle according to the application example described above, wherein a plurality of the electrodes are arranged substantially parallel to an extending direction of the shaft portion on the surface of the first case, and a plurality of projections projecting from the surface of the first case much more than the plurality of electrodes are provided at both ends of the electrodes.

According to this application example, since the projections project much more than the electrodes, it is possible to prevent a short circuit of the electrodes due to misalignment between the information terminal device and the cradle when setting the information terminal device. Moreover, the structure does not cause a short circuit even if a metal substance is accidentally interposed.

APPLICATION EXAMPLE 6

This application example is directed to the cradle according to the application example described above, wherein the shaft portion includes a spring applying a biasing force in a direction in which the first claw portion and the second claw portion come close to each other, and the biasing force of the spring is from 500 gf to 1000 gf.

According to this application example, by grasping the cradle with one hand and through the grasping operation of the hand, the opening operation of the cradle can be performed, so that the opening operation can be performed with a small force using leverage. Therefore, even a woman or child with a weak force and a small hand, and even further an elderly person whose hand action is slow can easily operate the cradle.

APPLICATION EXAMPLE 7

This application example is directed to the cradle according to the application example described above, wherein the second case includes a contact portion contacting the first case when at least one of the first case and the second case rotationally moves with the shaft portion as a reference.

According to this application example, since the contact portion of the second case serves as a stopper when opening the cradle, it is possible to inhibit a user's excessive opening operation of the cradle. Moreover, the number of components can be reduced.

APPLICATION EXAMPLE 8

This application example is directed to the cradle according to the application example described above, wherein a second recessed portion is formed in a surface of the second case on the side opposite to the contact portion.

According to this application example, by lightly pressing the second recessed portion, the opening operation of the cradle can be simply performed with one hand.

APPLICATION EXAMPLE 9

This application example is directed to the cradle according to the application example described above, wherein the cradle further includes, on the surface of the second case facing the electrode, a fixing portion fixing the information terminal device, and a distance between the fixing portion and the second claw portion is shorter than a distance between the electrode and the first claw portion.

According to this application example, since the distance between the fixing portion and the second claw portion is shorter than the distance between the electrode and the first claw portion, it is possible to prevent an erroneous operation of operation buttons when setting the information terminal device. Moreover, since the fixing portion more reliably holds the information terminal device, a contact failure of the electrode can be prevented.

BRIEF DESCRIPTION OF THE DRAWINGS

The invention will be described with reference to the accompanying drawings, wherein like numbers reference like elements.

FIGS. 1A to 1C are diagrams showing a structure of a cradle according to an embodiment, in which FIG. 1A is a perspective view, FIG. 1B is a left side view, and FIG. 1C is a right side view.

FIGS. 2A to 2C are diagrams showing the structure of the cradle according to the embodiment, in which FIG. 2A is a top view, FIG. 2B is a rear view, and FIG. 2C is a bottom view.

FIGS. 6A to 6C are diagrams showing an information terminal device according to the embodiment, in which FIG. 6A is a diagram showing a state of being placed on the cradle, FIG. 6B is a front side perspective view, and FIG. 6C is a rear side perspective view.

DESCRIPTION OF EXEMPLARY EMBODIMENTS

Hereinafter, an embodiment in which the invention is embodied will be described in accordance with the drawings. The drawings to be used are shown by being appropriately enlarged or reduced so that a portion to be described is in a recognizable state.

Figure 2A:
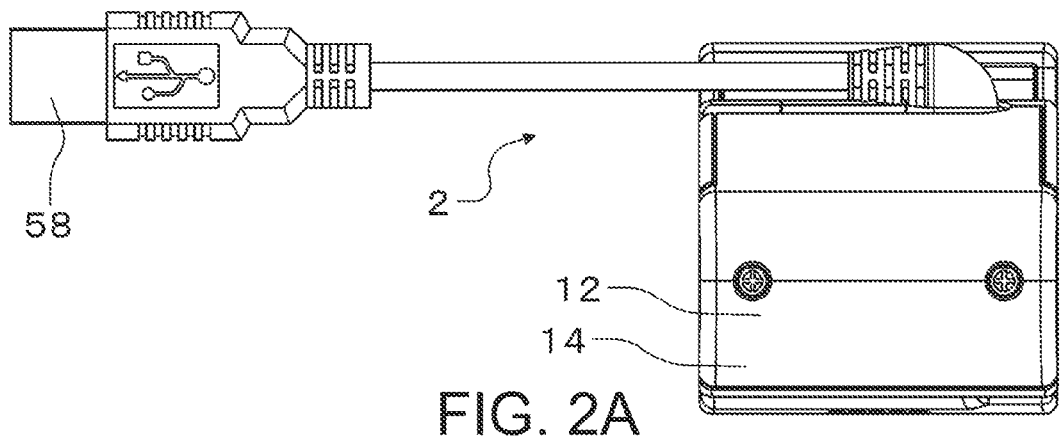
Figure 2B:
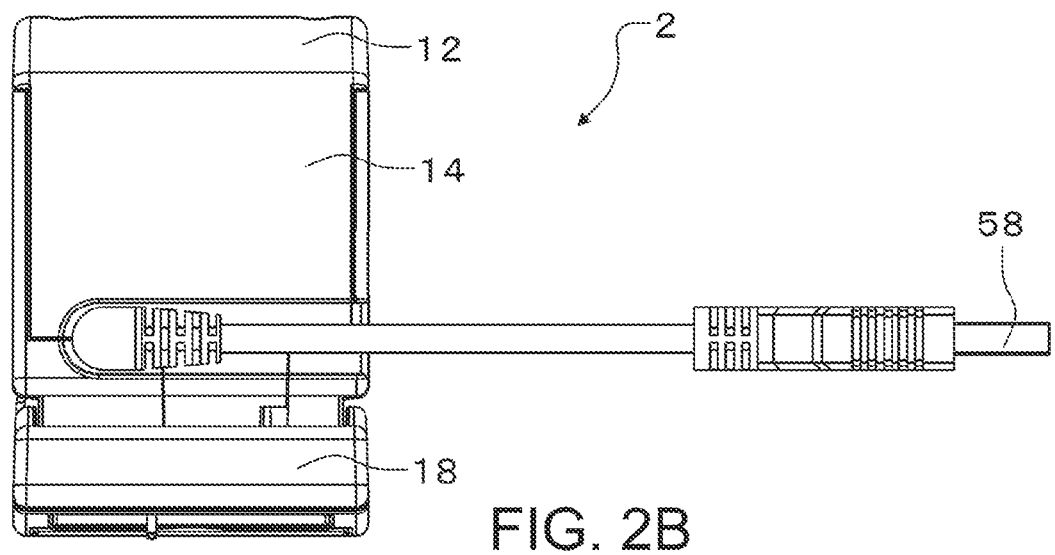
Figure 2C:
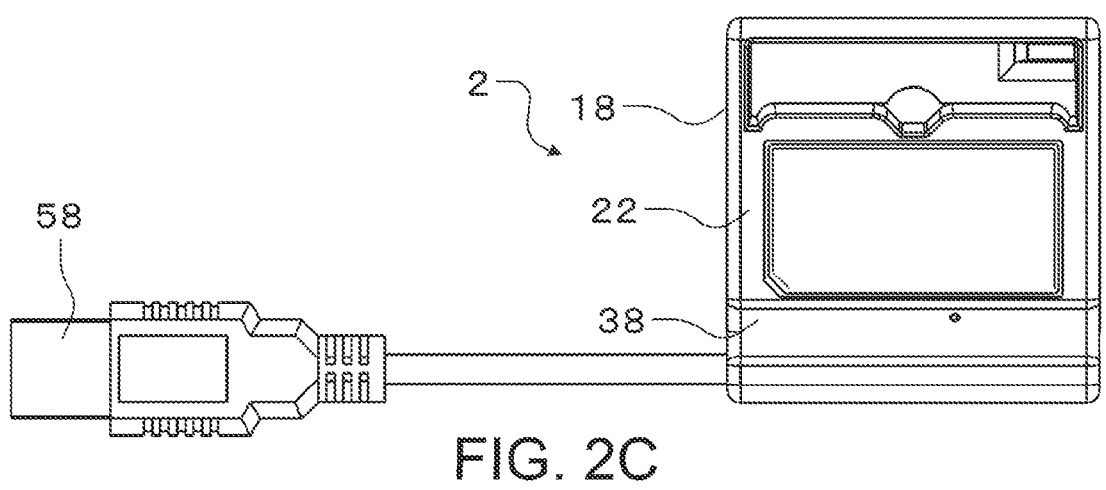
Figure 3:
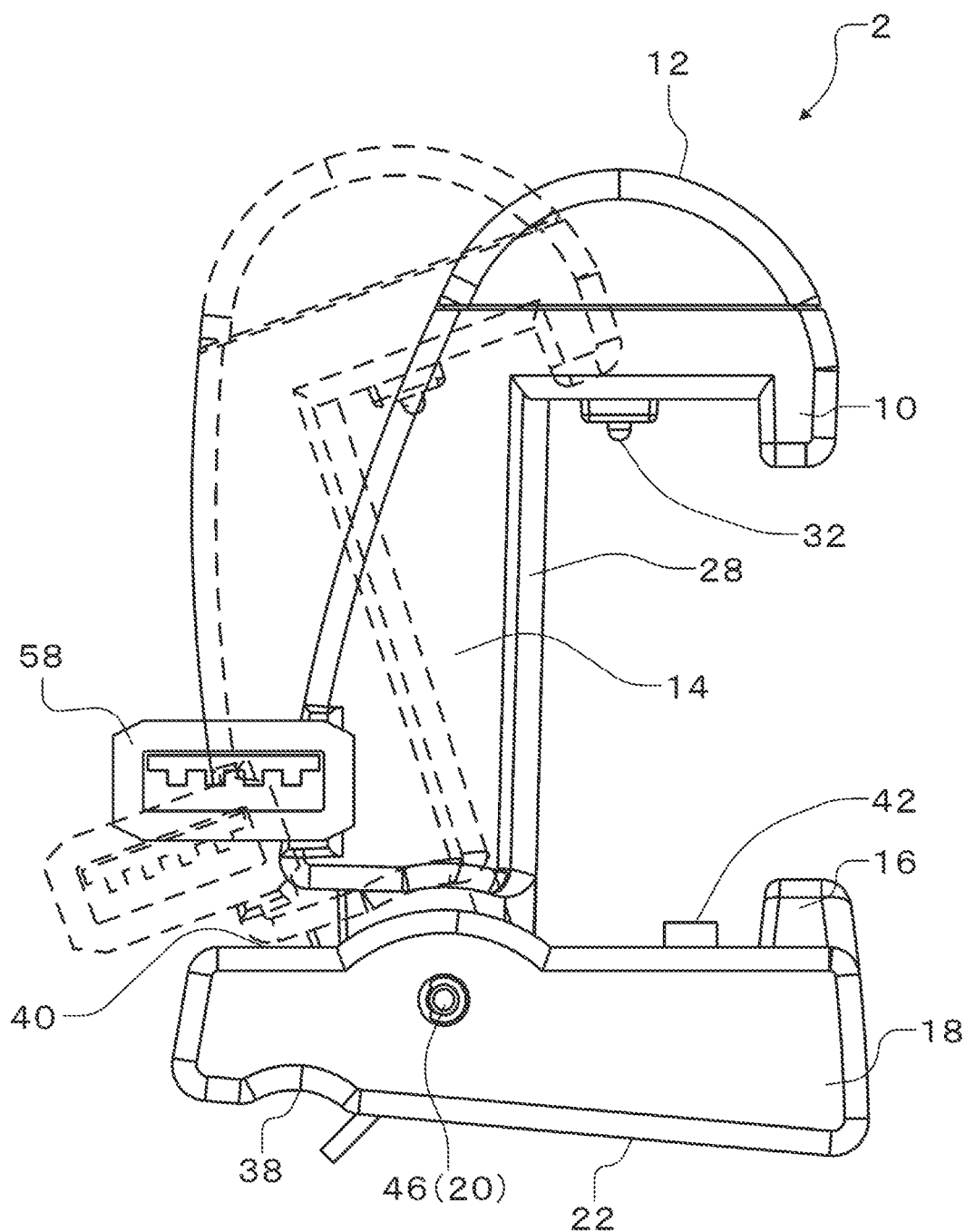
FIG. 3 is a side view showing open and closed states of the cradle according to the embodiment.

FIGS. 1A to 1C are diagrams showing a structure of a cradle 2 according to the embodiment. FIG. 1A is a perspective view, FIG. 1B is a left side view, and FIG. 1C is a right side view. FIGS. 2A to 2C are diagrams showing the structure of the cradle 2 according to the embodiment. FIG. 2A is a top view, FIG. 2B is a rear view, and FIG. 2C is a bottom view. FIG. 3 is a side view showing open and closed states of the cradle 2 according to the embodiment. Hereinafter, the structure of the cradle 2 will be described with reference to FIGS. 1A to 3.

The cradle 2 according to the embodiment includes a first case 14 including a first claw portion 10 and a curved surface portion 12 contacting the human body, a second case 18 including a second claw portion 16, and a shaft portion 20 holding the first case 14 and the second case 18. In the cradle 2, the first case 14 and the second case 18 can mutually rotationally move about the shaft portion 20 (refer to FIG. 3). A distance between the first claw portion 10 and the second claw portion 16 is increased by operating the curved surface portion 12 of the first case 14 and a surface 22 of the second case 18. The cradle 2 is connected to a small information terminal device of wristwatch type that displays information and includes a wristband (hereinafter abbreviated to "information terminal device") 4. The information terminal device 4 is detachable relative to the cradle 2. By setting the information terminal device 4 in the cradle 2, charging and data communication of the information terminal device 4 can be performed. Details of the information terminal device 4 will be described later.

The first case 14 is formed of a container body having a square block shape. The curved surface portion 12 is formed in an overhang manner. The first case 14 includes a first recessed portion 24 formed on the side opposite to the curved surface portion 12 and conforming to the shape of the information terminal device 4. The first recessed portion 24 is formed on an overhanging inside surface of the first case 14. The first recessed portion 24 includes a bottom portion 26. A portion of the information terminal device 4 that is detachably mounted is accommodated in the first recessed portion 24. According to this configuration, since the first recessed portion 24 conforming to the shape of the information terminal device 4 is provided in the first case 14 and functions as a positioning structure, position alignment between the cradle 2 and the information terminal device 4 is smoothly performed, so that the information terminal device 4 can be easily set in the cradle 2. Moreover, by deeply forming the first recessed portion 24, a surface of the information terminal device 4 facing the first recessed portion 24 can be prevented from contacting a surface of the cradle 2. In this case, it is preferable that a distance from electrode pins 36 or projections 32 of the cradle 2 to the bottom portion 26 (a surface facing the information terminal device 4) of the first recessed portion is longer than a distance from terminals 60 of the information terminal device 4 to a bottom surface portion 30 of the information terminal device 4.

The first case 14 includes a pair of tapered surfaces 28 provided at edges of the first case 14. Each of the pair of tapered surfaces 28 is inclined downward toward the outside of the first case 14 along a direction substantially parallel to the shaft portion 20. According to this configuration, fitting with the information terminal device 4 is smoothly performed by adjusting the tapered surfaces 28 to the R-shape of the bottom surface portion 30 (refer to FIG. 6C) of the information terminal device 4, so that setting property can be improved.

The projections 32 with which the information terminal device 4 can be positioned and fixed are provided on an overhanging inside surface of the first case 14. In other words, the projections 32 are provided on a surface constituting the first case 14 and corresponding to a rear surface of the curved surface portion 12. Alternatively, it can be said that at least one of surfaces of the first case 14 facing the information terminal device 4 includes electrodes. The projections 32 fit into recessed portions 34 of the information terminal device 4. Therefore, the projection 32 functions as a positioning structure in setting of the information terminal device 4. Moreover, the first case 14 includes the plurality of projections 32 having a height higher than that of the electrode pin (electrode) 36. The projections 32 are provided so as to interpose the electrode pins 36 therebetween on a surface on which the electrode pins 36 are formed. According to this configuration, since the projections 32 are higher than the electrode pins 36, it is possible to prevent a short circuit of the electrode pins 36 due to misalignment between the information terminal device 4 and the cradle 2 when setting the information terminal device 4. Moreover, the structure does not cause a short circuit even if a metal substance is accidentally interposed. For example, the structure does not cause a short circuit between Vbus and GND as USB terminals in the embodiment. The tip of the projection 32 may be formed in a tapered shape capable of contacting an inner surface of the recessed portion 34 of the information terminal device 4. Further, the GND terminal may be configured to project beyond the other terminals in a direction of the second case and to have a smaller amount of projection than that of the projection 32. With the configuration described above, since the GND terminal first contacts the information terminal device 4 while maintaining an effect due to the projections 32, it is possible to provide a safety design conforming to the USB standard.

The second case 18 includes the surface 22 located, with the shaft portion 20 as a reference, on the side opposite to the second claw portion 16 and having a surface substantially parallel to the shaft portion 20. The surface 22 is a rectangular bottom surface for placing the cradle 2 on a desk. A second recessed portion 38 is formed in the surface 22 on the side opposite to a contact portion 40 of the second case 18. According to this configuration, by lightly pressing the second recessed portion 38, an opening operation of the cradle 2 can be simply performed with one hand.

The second case 18 includes the contact portion 40 (refer to FIG. 3) that one end of the first case 14 contacts as the first case 14 and the second case 18 are opened. The contact portion 40 has a function as a stopper that restrains the first case 14 and the second case 18 from opening at more than a predetermined angle. According to this configuration, since the contact portion 40 of the second case 18 serves as a stopper when opening the cradle 2, it is possible to inhibit a user's excessive opening operation of the cradle 2. Moreover, the number of components can be reduced.

The second case 18 includes a fixing portion 42 provided on a surface of the second case 18 and fixing the information terminal device 4. The position of the fixing portion 42 is arranged on the surface of the second case 18 facing the projections 32 or the electrode pins 36 of the first case 14. The position of the fixing portion 42 is located, with the shaft portion 20 as a center, outside the positions of operation buttons 44 (refer to FIG. 6B) of the information terminal device 4. The height of the fixing portion 42 is higher than that of the operation buttons 44. In other words, a distance between the second claw portion 16 and the fixing portion 42 of the second case 18 is shorter than a distance between the first claw portion 10 and the projections 32 or the electrode pins 36 of the first case 14. According to this configuration, since the distance between the fixing portion 42 and the second claw portion 16 is shorter than the distance between the electrode pins 36 and the first claw portion 10, it is possible to prevent an erroneous operation of the operation buttons 44 when setting the information terminal device 4. Moreover, since the fixing portion 42 more reliably holds the information terminal device 4, a contact failure of the electrode pin 36 can be prevented. The material of the fixing portion 42 is, for example, a rubber.

The curved surface portion 12 of the first case 14 and the surface 22 of the second case 18 are configured to be of a size such that they can be simultaneously gripped with one hand. According to this configuration, the cradle 2 is put on one palm such that the curved surface portion 12 of the first case 14 is arranged on the finger side and the surface 22 of the second case is arranged on the wrist side in a state where the first claw portion and the second claw portion are directed in a direction opposite to the palm. Then, with a natural grasping action, stresses act on the curved surface portion 12 and the surface 22, and the first case 14 and the second case 18 rotationally move with the shaft portion 20 as a starting point. Therefore, a relative distance between the first claw portion 10 and the second claw portion 16 is increased, so that the cradle 2 is brought into a state where the information terminal device 4 can be set in the cradle 2. Then, with the use of the projections 32 or the bottom portion 26, the information terminal device 4 is set in the cradle 2 such that the electrode pins 36 of the cradle 2 and the terminals 60 of the information terminal device 4 contact each other. After setting the information terminal device 4 in the cradle 2, the first case 14 and the second case 18 rotationally move with the shaft portion 20 as a starting point with an opening action of the palm, the relative distance between the first claw portion 10 and the second claw portion 16 is reduced, and the first case and the second case fix the information terminal device 4. In this manner, since the cradle can be opened or closed with a natural action such as the grasping action or opening action of the palm, the cradle with good operability can be provided. Moreover, a force is applied more easily with an operation using the palm than with an operation using the fingers as in a clothespin, so that the cradle is easy to use.

For example, as to the size of the cradle 2, the height of the cradle 2 from a desk in a state where the cradle 2 is placed on the desk is 70 mm or less. According to this configuration, the cradle is easy to use for a woman with a small hand. Moreover, since the height is 70 mm or less, the cradle can serve from a person with a large hand to a person with a small hand.

Figure 4:
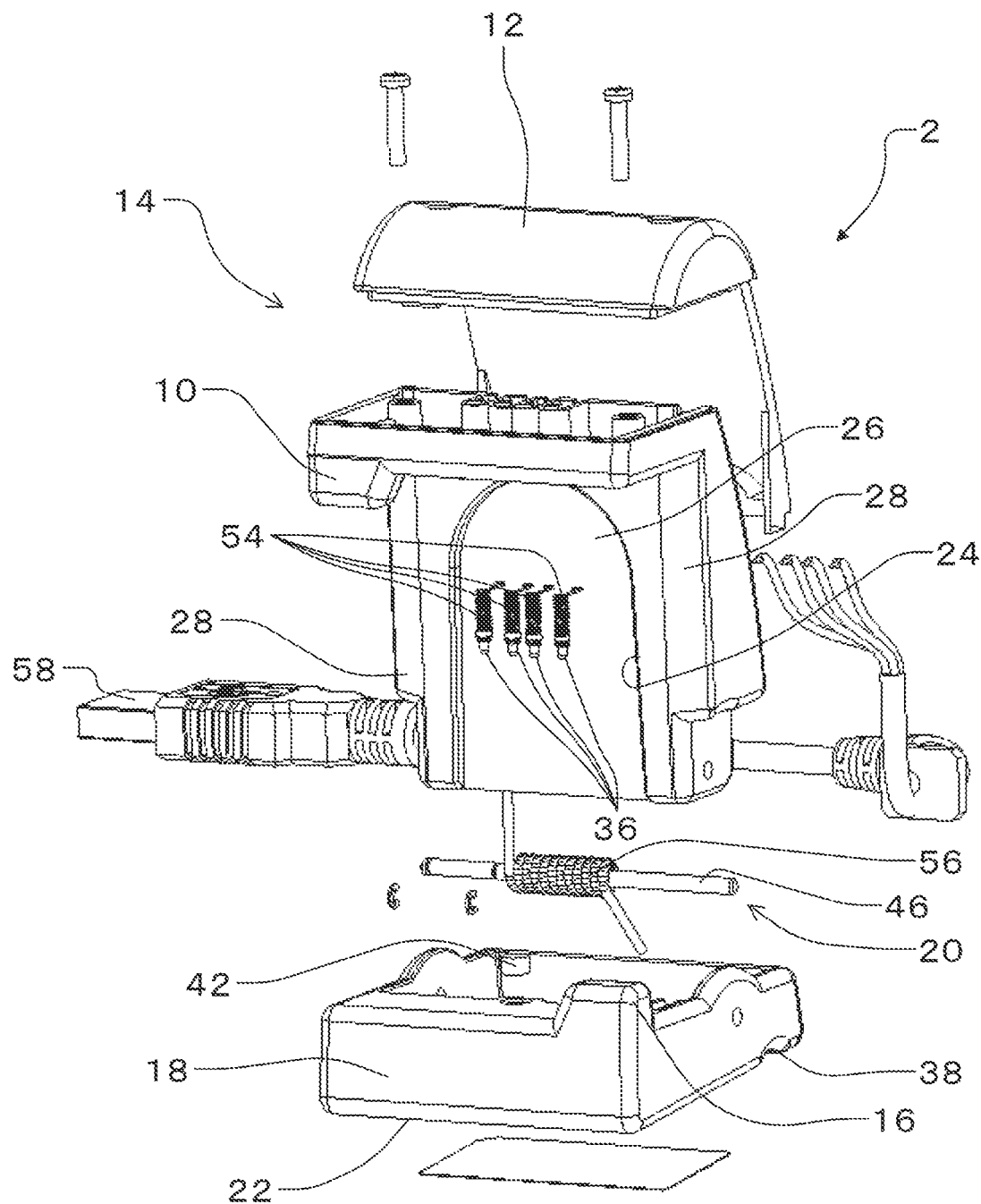
FIG. 4 is an exploded view showing the structure of the cradle according to the embodiment.

FIG. 4 is an exploded view showing the structure of the cradle 2 according to the embodiment.

The shaft portion 20 includes a spring 56 and a shaft 46. The spring 56 applies to the first case 14 a biasing force (load) in a direction in which the first case 14 and the second case 18 are closed. The load of the spring is from 500 gf to 1000 gf. According to this configuration, the opening operation of the cradle 2 can be performed by grasping the cradle 2 with one hand and through the grasping operation of the hand, so that the opening operation can be performed with a small force using leverage. Therefore, even a woman or child with a weak force and a small hand, and even further an elderly person whose hand action is slow can easily operate the cradle 2.

Figure 5:
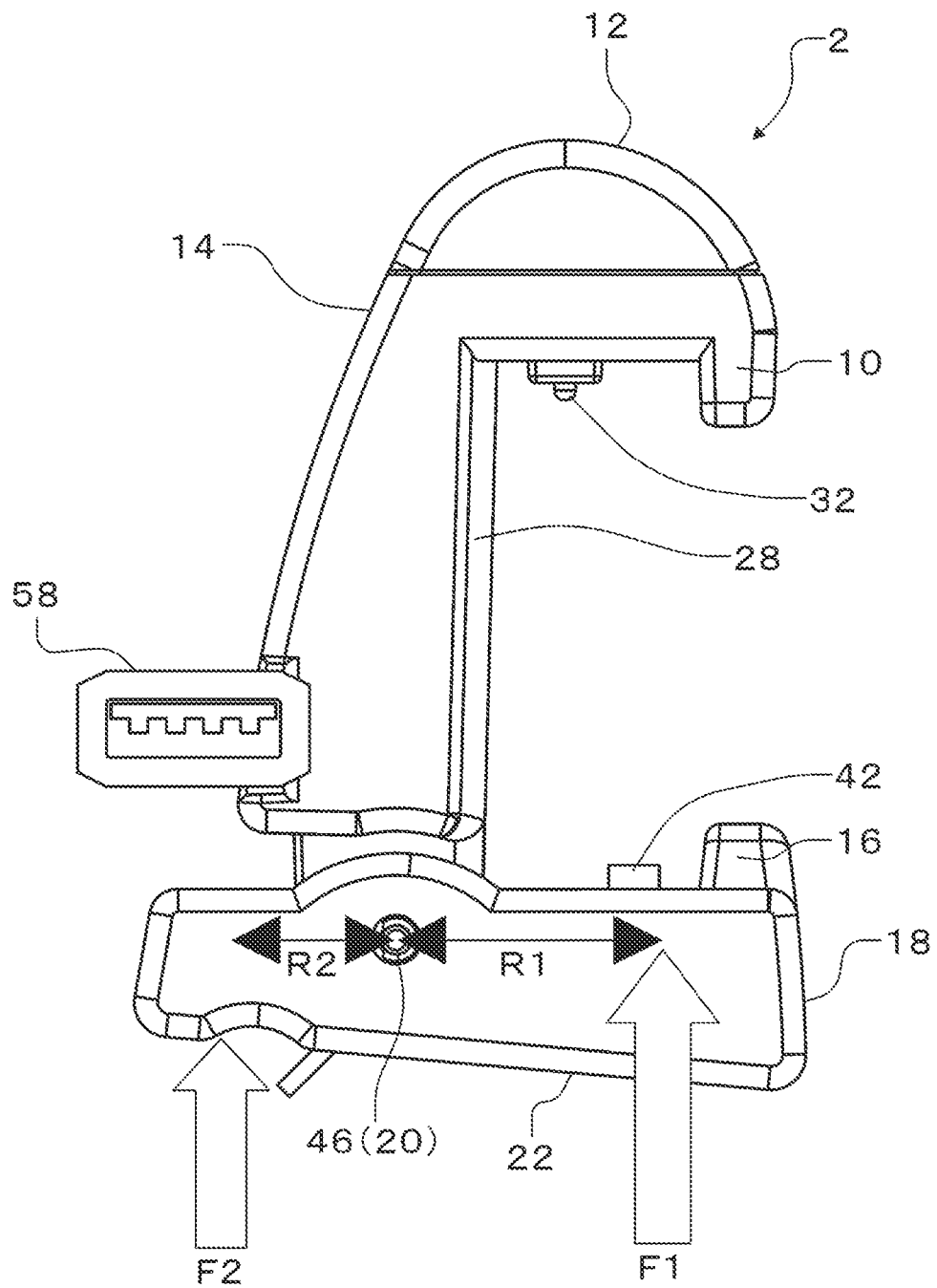
FIG. 5 is a side view explaining the load of a spring of the cradle according to the embodiment.

FIG. 5 is a side view explaining the load of the spring 56 of the cradle 2 according to the embodiment.

As to the strength of the spring 56 as shown in FIG. 5, the load of the spring 56 is set by setting a load F1 with which the main body of the information terminal device 4 (illustration is omitted) is interposed and a load F2 with which the user opens the cradle 2 in the following range. As to distances R1 and R2 in view of the load in this case, since R1 is determined by the size of the main body of the information terminal device 4, the load F2 with which the user opens the cradle 2 can be adjusted by adjusting R2.

For easiness in setting the information terminal device 4 in the cradle 2, "angle property between the first case 14 and the second case 18 that rotationally move about the shaft portion 20" was evaluated according to the following criteria while varying the load of the spring. "A" indicates good operability, "B" indicates slightly good operability, and "C" indicates poor operability.

Moreover, "distance property between the first claw portion 10 and the second claw portion 16" was evaluated according to the following criteria while varying the load of the spring. "A" indicates good setting property of the information terminal device, "B" indicates slightly good setting property, and "C" indicates poor setting property. Table 1 shows these results.

TABLE 1

|  | Sample 1 | Sample 2 | Sample 3 |
| --- | --- | --- | --- |
| Load of spring | less than 500 gf | 500 gf to 1000 gf | over 1000 gf |
| Angle between cases | B | A | C |
| Distance between claw portions | C | A | C |

The load F1 is defined as a load to ensure a contact load min 70 gf of the electrode pin 36. In that regard, a load min 600 gf is required in consideration of contact loads of four electrode pins 36 and variations thereof. Moreover, the load F2 is defined as a load that even a woman can handle, and an optimum range of the load F2 is set (measured value) to be from 500 gf to 1000 gf. By setting a required load to be in this range, the cradle can be rotationally moved with a force to such an extent that the user lightly grasps his/her hand. Therefore, operability when setting the information terminal device 4 in the cradle 2 is improved.

The cradle 2 includes the electrode pins 36. The tip of the electrode pin 36 projects from a surface of the first case 14. The projecting direction of the electrode pin 36 is the direction of gravitational force when placing the cradle 2 on the desk with a surface of the second case 18 on the side opposite to a surface thereof facing the information terminal device 4 facing down. In other words, the electrode pins 36 are formed, in a direction substantially parallel to a plane including the bottom portion 26 of the first case 14 and perpendicular to the surface on which the electrode pins 36 are arranged, so as to extend or project toward the second case 18 side. Alternatively, the electrode pins project from the surface of the first case facing the information terminal device toward the surface of the second case. According to this configuration, since the electrode pins 36 are arranged downward, it is possible to prevent dust or the like from adhering to the electrode pins 36. The electrode pin 36 is exposed from an opening that is somewhat larger than the tip of the electrode pin 36. The electrode pin 36 has elasticity. The electrode pin 36 is mounted in the first case 14 such that the electrode pin 36 enters into the first case 14 when pressed, while the electrode pin 36 is pushed back in a direction in which the tip thereof protrudes from the opening when the pressing force is weakened. At the circumferential edge of the opening, a bulging portion that bulges high above a surrounding upper surface thereof is formed. The pair of projections 32 that abut on the recessed portions 34 of the information terminal device 4 when the information terminal device 4 is accommodated in the first recessed portion 24 are formed on the surface of the first case 14 so as to interpose the openings between the left and right sides. The electrode pins 36 are pressed by springs 54 (refer to FIG. 4) held to the first case 14.

The electrode pins 36 are composed of a charging electrode pin and a communication electrode pin. The charging electrode pin is composed of a charging electrode first pin and a charging electrode second pin. The communication electrode pin is composed of a communication electrode first pin and a communication electrode second pin.

The cradle 2 of the embodiment includes a unit configured to receive power supply from an external device connected to the electrode pins 36. According to this configuration, since the unit configured to receive power supply from the external device is included, power can be easily supplied to the electrode pins 36.

The cradle 2 includes a USB connector 58. In the cradle 2 of the embodiment, a USB cable capable of high-speed transmission of data is used as a cable for connecting with an external device such as a personal computer (PC), which enables data communication at high speed. The USB connector 58 is composed of, for example, standard five pins (D+, D−, Vbus, GND, and ID).

When a PC is connected to the USB connector 58, the "D+", "D−", "Vbus", and "GND" terminals of the USB connector 58 are used. The "D+" terminal of the USB connector 58 is connected to the communication electrode first pin. The "D−" terminal is connected to the communication electrode second pin. With this configuration, the cradle 2 relays communication signals between a USB controller of the information terminal device 4 connected to the electrode pins 36 and the PC connected to the USB connector 58.

The "Vbus" terminal is a +5V voltage terminal fed with power from the PC via the USB cable. The "Vbus" terminal of the USB connector 58 is connected to the charging electrode first pin. The "GND" terminal is connected to the charging electrode second pin. With this configuration, the cradle 2 can charge, with the use of the voltage supplied via the USB cable, a battery (secondary battery) of the information terminal device 4 connected to the electrode pins 36. According to this configuration, the charging and communication functions of the cradle 2 can be easily constructed. Depending on the specifications of the information terminal device 4, the "D−" terminal may be connected to the communication electrode first pin, while the "D+" terminal may be connected to the communication electrode second pin. Moreover, depending on the specifications of the information terminal device 4, the "GND" terminal may be connected to the charging electrode first pin, while the "Vbus" terminal may be connected to the charging electrode second pin.

FIGS. 6A to 6C are diagrams showing the information terminal device 4 according to the embodiment. FIG. 6A is a diagram showing a state of being placed on the cradle 2, FIG. 6B is a front side perspective view, and FIG. 6C is a rear side perspective view.

The information terminal device 4 is a small information terminal device of wristwatch type including a wristband. In the information terminal device 4, the operation buttons 44 are formed on a side surface on a 3H side. In the information terminal device 4, four terminals as the terminals 60 are arranged on a side surface on a 9H side. The terminals 60 are composed of two charging terminals and two communication terminals. The information terminal device 4 includes a display unit 64. By setting the information terminal device 4 in the cradle 2, charging and data communication of the information terminal device 4 are performed.

The recessed portions 34 are arranged on the side surface of the information terminal device 4 on which the terminals 60 are arranged. With the fitting of the recessed portions 34 and the projections 32 of the first case 14 together, the positions of the information terminal device 4 in a planar direction and a cross-sectional direction with respect to the cradle 2 are determined. By setting the information terminal device 4 in the cradle 2, the information terminal device 4 is held to the cradle 2, so that when an impact is applied to the cradle 2 or the information terminal device 4, the structure prevents the information terminal device 4 from coming off the cradle 2. According to this configuration, the connection accuracy between the electrode pins 36 and the terminals 60 of the information terminal device 4 can be improved. Moreover, since a terminal surface of the terminals 60 provided on the side surface of the information terminal device 4 can be configured to be small, the plurality of terminals for charging and communication that are arranged on the side surface of the information terminal device 4 can be arranged such that the presence of the terminals is unobtrusive. Further, since the information terminal device 4 can be held to the cradle 2 using the projections 32, an information terminal device 4 having a different thickness can also be set in the cradle 2, so that the cradle 2 can be commonly used.

The information terminal device 4 senses the user's pulse or the like, measures, for example, consumption calorie, the number of steps, or the like based on the sensed pulse or the like and the user's body weight, height, age, or the like, and stores the obtained measurement data (exercise data) in a non-volatile storage unit (not shown) such as an EEPROM (for example, a flash memory).

When the user operates the operation buttons 44 of the information terminal device 4 to give an instruction to transmit the measurement data, the measurement data stored in the non-volatile storage unit is transmitted to the cradle 2 via the electrode pin 36. The cradle 2 is connected with the PC through cable communication such as, for example, a USB, and the measurement data from the information terminal device 4 is transmitted to the PC via cable communication.

Software to cooperate with the information terminal device 4 is previously installed in the PC, and the measurement data from the information terminal device 4 is transmitted using the software to an external server system via a network.

The network is a communication channel using, for example, the Internet, a wireless LAN, or the like, and can include a communication network such as a telephone communication network, a cable network, or a wireless LAN, in addition to a LAN using a dedicated line for direct connection, Ethernet (registered trademark), or the like.

The server system provides an exercise program service to the user via the network. That is, the server system performs data processing on the measurement data (exercise data) received from the PC via the network, generates display data such as, for example, time-series information of the consumption calorie, and transmits the display data to the PC via the network. For example, the display data is provided in the HTML format, and the PC displays the display data on the display unit such as an LCD using a web browser or the like.

When the information terminal device 4 is set in the cradle 2, the electrode pins 36 projecting from the surface of the first case 14 of the cradle 2 contact the terminals 60 located on the side surface of the information terminal device 4 in a state where the electrode pins 36 are pressed against the terminals 60, so that the charging and data communication of the information terminal device 4 are performed.

The information terminal device 4 is accommodated in the first recessed portion 24 of the cradle 2 when performing charging, data transfer, or the like. Since the first recessed portion 24 is formed in a shape somewhat larger than the main body and band of the information terminal device 4, the information terminal device 4 is accommodated in a state of being positioned with respect to the cradle 2. The information terminal device 4 according to the embodiment is mounted on the user's arm in a normal use state. Although it is needless to say that date, time, and the like are displayed on the display unit 64, the information terminal device 4 is configured to detect and store living body information such as a pulse rate or a heart rate with a sensor or the like (not shown) at regular time intervals.

When the information terminal device 4 including the display unit 64 on which visually recognizable display is performed is set, the information terminal device 4 may be configured such that the display unit 64 is controlled so as to perform display notifying the user of the fact that the information terminal device 4 is properly set in the cradle 2. According to this configuration, a device system formed of the information terminal device 4 and the cradle 2 can be utilized as an interior accessory of a room, so that the information terminal device 4 can be effectively utilized when not in use.

According to the embodiment, when the information terminal device 4 is put into the first recessed portion 24, the tips of the projections 32 and a case of the information terminal device 4 contact each other. When the information terminal device 4 is further put into the first recessed portion 24, the projections 32 fit into the recessed portions 34 of the information terminal device 4, and therefore, the information terminal device 4 can be easily mounted in the cradle 2.

When the information terminal device 4 is set in a correct direction, the projections 32 fit into the recessed portions 34 of the information terminal device 4. Moreover, the electrode pins 36 project from the upper surface of the first case 14 of the cradle 2 to contact the terminals 60 located on the side surface of the information terminal device 4.

Operations according to the embodiment will be described.

The cradle 2 according to the embodiment is a cradle for the information terminal device 4. When the information terminal device 4 is mounted in the cradle 2, the electrode pins 36 provided on the upper surface of the first case 14 are connected to the terminals 60 provided on the side surface of the information terminal device 4 in a state where the electrode pins 36 are pressed against the terminals 60. This makes it possible to reliably carry out the charging of the information terminal device 4 and outputting of information from the information terminal device 4. The detection of the placement state of the information terminal device 4 on the cradle 2 may be performed separately by the PC and the information terminal device 4.

FIGS. 1A to 1C show a state of the cradle 2 before the information terminal device 4 is mounted therein, and in this state, the projections 32 and the electrode pins 36 are projected on the upper surface of the first case 14. In other words, FIGS. 1A to 1C in a free state before the information terminal device 4 is mounted in the cradle 2 is shown.

In a use state as shown in FIG. 6A, the tips of the electrode pins 36 pressed by the springs 54 held to the first case 14 are projected from the openings of the first case 14 by mounting the information terminal device 4 in the cradle 2, and the tips of the electrode pins 36 are brought into pressure contact with the terminals 60 of the information terminal device 4 set at a predetermined position. With this configuration, the information terminal device 4 accommodated in the cradle 2 is electrically connected with an external power supply (not shown), and communication work of the information terminal device 4 or charging work for the battery is carried out.

As the material of the first case 14 and the second case 18 described above, for example, an ABS resin (acrylonitrile-butadiene-styrene resin) can be used. Moreover, it is also possible to use not only various engineering plastics having a certain degree of strength and heat resistance but also a metal such as an aluminum alloy or a nickel alloy.

The material of the electrode pin 36 is not particularly limited as long as the material has substantial conductivity, and examples thereof include a metal material such as, for example, copper, aluminum, or an alloy including these materials.

The cradle 2 having the configuration described above can be used, for example, as follows. First, although not shown in detail, the USB connector 58 coming from the first case 14 is previously connected to a PC (not shown).

Next, the user grasps the cradle 2 with one hand, and performs the opening operation of the cradle 2 through the grasping operation of the hand. Then, when the user inserts (puts) the information terminal device 4 into the first recessed portion 24 of the cradle 2, the terminals 60 of the information terminal device 4 press down the electrode pins 36 projecting through the openings on the surface of the first case 14 and pressed by the springs 54 held to the first case 14.

In that case, when the information terminal device 4 is inserted into the first recessed portion 24 of the cradle 2, the projections 32 fit into the recessed portions 34 of the information terminal device 4. Further, the fixing portion 42 locks the side surface of the information terminal device 4 on the side (3H side) opposite to the terminals 60.

As a result, the tips of the electrode pins 36 engage with the terminals 60 of the information terminal device 4, so that charging and data communication are performed. When the information terminal device 4 is removed from the cradle 2 due to the completion of the charging and data communication or the like, the electrode pins 36 are restored to their initial positions by repulsive forces of the springs 54.

According to the embodiment, the cradle 2 has an interposing structure for setting the information terminal device 4 in the cradle, in which the structure is configured such that when the cradle 2 is not operated, a distance between the first claw portion 10 and the second claw portion 16 is short, while when a rotational movement operation of the cradle 2 is performed, the distance between the first claw portion 10 and the second claw portion 16 is increased. With this configuration, it is possible to prevent the information terminal device 4 from being forcibly pushed into and set in the cradle 2. Moreover, because of claw structures (the first claw portion 10 and the second claw portion 16) protruding in an eaves shape and provided in the first case 14 and the second case 18 that interpose the information terminal device 4 therebetween, it is possible to restrain an operation of forcibly pushing the information terminal device 4 into the cradle 2 or forcibly pulling out the information terminal device 4 set in the cradle 2, so that an improper operation such as damaging the information terminal device 4 can be prevented. As a result, the information terminal device 4 can be easily set in the cradle without damaging the information terminal device 4, which minimizes forces applied to the cradle 2 and the information terminal device 4 in setting. Therefore, the cradle 2 having enhanced product reliability can be provided.

Moreover, since the hand is in contact with the curved surface portion of the first case 14 when performing the rotational movement operation of the cradle 2, the hand does not hurt, so that a burden or the like on the user is reduced.

Although the embodiment has been specifically described so far, the invention is not limited to the embodiment, and various modifications are possible.

The connector is not limited to the USB connector 58. For example, the connector may be an HDMI (registered trademark) connector. In addition, the connector may have any form as long as the connector can supply power for charging the information terminal device 4.

A case has been shown in which the detection of the placement state of the information terminal device 4 on the cradle 2 is performed in the information terminal device 4. However, for example, a CPU or the like may be provided on the cradle 2 side to perform control such that the detection of the placement state of the information terminal device 4 is performed on the cradle 2 side and different processing operations are performed based on the detection result.

Moreover, as an example of data communication with an external device, data communication with a personal computer is exemplified. In addition, however, data communication with, for example, a smartphone or a printer may be performed, or by connecting with a storage device such as a hard disk or an optical disc, data in the information terminal device 4 may be stored or processing for synchronizing stored contents of data with these devices may be performed.

The communication cable connecting an external device such as a personal computer with the cradle 2 is not limited to the USB cable, and an IEEE1394 cable or the like may be used.

For the form of the USB connector 58, various forms such as A type, B type, mini-A type, and mini-B type may be combined as necessary.

The cradle 2 of the embodiment is not limited to the embodiment described above, and it is needless to say that various modifications and changes are possible in configuration, shape, material, or the like within a range not departing from the configuration of the embodiment. In the embodiment, an example has been described in which the embodiment is applied to a small information terminal device of wristwatch type including a wristband as a specific example of an information terminal device. In addition, the embodiment can be applied also to a PHS, a PDA, a PC, a mobile tool, an electronic dictionary, a calculator, a game console, and the like.

What is claimed is:

1. A cradle connecting with an information terminal device that displays information, comprising:
   a first case including a first claw portion and a curved surface portion;
   a second case including a second claw portion; and
   a shaft portion holding the first case and the second case,
   wherein at least one of the first case and the second case rotationally moves with the shaft portion as a reference to thereby increase a distance between the first claw portion and the second claw portion;
   wherein a first surface of the first case includes an electrode projecting from the first surface of the first case toward a second surface of the second case;
   wherein the information terminal device includes a first side including a device electrode, a second side opposite the first side, and a display positioned between the first side and second side;
   wherein the cradle is configured to receive the information terminal device wherein the first side is received within a first recessed portion of the first case, the device electrode contacts the electrode of the first surface, the second side is received within a second recessed portion of the second case, and the display is facing away from the first case.

2. The cradle according to claim 1, wherein the first recessed portion conforms to the shape of the information terminal device.

3. The cradle according to claim 1, wherein
   the first case includes a pair of tapered surfaces provided at edges of the first case.

4. The cradle according to claim 1, wherein the first surface of the first case includes a plurality of electrodes arranged substantially parallel to an extending direction of the shaft portion, and
   wherein the first surface of the first case further includes a plurality of projections projecting from the first surface of the first case a greater distance than the plurality of electrodes extend from the first surface and the plurality of projections are provided at both ends of the electrodes.

5. The cradle according to claim 1, wherein
   the second case includes a contact portion contacting the first case when at least one of the first case and the second case rotationally moves with the shaft portion as a reference.

6. The cradle according to claim 5, wherein
   a second recessed portion is formed in a surface of the second case on the side opposite to the contact portion.

7. The cradle according to claim 1, further comprising:
   a fixing portion, on the second surface of the second case facing the electrode;
   wherein the second side of the information terminal device includes a device button extending beyond a surface of the second side;
   wherein the fixing portion extends beyond the second surface a greater distance than the device button extends beyond the surface of the second side of the information terminal device; and
   wherein the cradle is configured to receive the information terminal device wherein the fixing portion contacts the surface of the second side of the information terminal device and the device button does not contact the second surface of the of the second case.

8. A cradle connecting with an information terminal device that displays information, comprising:
   a first case including a first claw portion and a curved surface portion;
   a second case including a second claw portion; and
   a shaft portion holding the first case and the second case,
   wherein at least one of the first case and the second case rotationally moves with the shaft portion as a reference to thereby increase a distance between the first claw portion and the second claw portion; and
   wherein
   the shaft portion includes a spring applying a biasing force in a direction in which the first claw portion and the second claw portion come close to each other, and the biasing force of the spring is from 500 gf to 1000 gf.

* * * * *